Patented Mar. 8, 1938

2,110,241

UNITED STATES PATENT OFFICE 2,110,241

PROCESS OF REMOVING SULPHUR COMPOUNDS FROM GASES

Otto Roelen, Oberhausen-Holten, Germany, assignor to Studien- und Verwertungsgesellschaft m. b. H., Mulheim-Ruhr, Germany No Drawing. Application October 31, 1935, Serial No. 47,636. In Germany November 5, 1934

3 Claims. (Cl. 23—3)

My invention relates to the removal of sulphur from gases. It has particular reference to the purification of gas mixtures containing CO and H by the removal of the sulphur combined with organic radicals which are admixed to these gases, and it is an object of my invention to provide means, whereby this purification is rendered easier and more effective than similar purification processes hitherto in use.

As is well known to those skilled in the art, the removal of all the sulphur, including that combined with organic radicals, from gas mixtures containing CO and H has hitherto been effected either by catalytical decomposition of the organic sulphur compounds at a temperature above normal followed by extraction of the hydrogen sulphide formed by this decomposition, or by directly combining these compounds with gas purification masses capable of absorbing sulphur at a temperature above normal.

Either way of operating the purification involves drawbacks of its own. While it is true that the catalytic purification is a continuous operation not requiring the addition of chemicals other than those designed to extract the hydrogen sulphide, it is impossible to thus effect in a single operation the complete removal of the sulphur including the last traces and to obtain gases of a purity such as is required for instance for the catalytic hydrogenation of carbon monoxide. On the other hand the direct extraction of the sulphur by chemical combination at an elevated temperature, while allowing the removal of all the sulphur excepting only insignificant traces, requires a corresponding consumption of purification chemicals for each gram of sulphur extracted and in addition the necessity of regenerating these chemicals.

According to the present invention I effect the purification of gas mixtures containing CO and H in two stages, in the first of which the bulk of the organic sulphur compounds is decomposed in a manner well known per se by catalytic reaction at an elevated temperature. I thereafter prefer extracting the hydrogen sulphide formed in the reaction and then fix completely the whole of the remaining sulphur at an elevated temperature by means of chemicals which absorb sulphur.

I thus succeed in radically removing the sulphur from gas mixtures containing CO and H without their composition suffering any other change. By thus combining the two greatly differing modes of purification I further obtain a purification process which offers quite a number of advantages as compared with each of these processes.

The catalytic purification which forms the first stage of my process is no more required to remove the last traces of sulphur and I am therefore enabled to operate in this stage at high gas velocities, so that the main quantity of the sulphur can be extracted quickly. Furthermore I need not fear that under the influence of a catalytic action of the walls of the apparatus, such as the heat exchanger, organic sulphur compounds might be regenerated from CO and $H_2S$ when the gases leaving the apparatus cool down, and I am therefore at liberty to transfer to the entering gas and to thus recover without any drawback the palpable heat of the gas treated in the first stage.

Furthermore, since it is not necessary that the decomposition be carried out in a quantitative manner, the gas may still carry along a small percentage of hydrogen sulphide. It is therefore possible to insert the catalytic decomposition in the normal process of removal of the hydrogen sulphide at a point where the main proportion of hydrogen sulphide has already been extracted. Therefore a separate extraction of hydrogen sulphide cannot only be dispensed with at the end of the catalytic purification stage, but I also recover, during the normal purification process by chemical combination with iron oxide or the like, that part of the sulphur which was originally present in the gas mixture in combination with organic radicals.

As regards the second stage of the process, the combined process according to this invention also offers a number of advantages. Since, if the first stage is operated in a correct manner, 90% or more of the sulphur may be removed, the consumption of chemical purification mass in the second stage will be low. Apart therefrom I have found that this mass is now enabled to retain the last traces of sulphur in a far more perfect manner than if the first stage of the process were omitted. I have for instance found that when using purification masses consisting of a mixture of an iron oxide and an alkali carbonate, the efficiency of the mass up to the point where the first traces of sulphur appear in the gas escaping from the mass is the greater the lower the initial concentration of the gas.

Thus the technical effect obtained by the combination of the two stages is far superior to a purely additive effect of the two individual stages.

There are a number of gas mixtures including for instance coke oven gas, which it is impossible to completely free from sulphur by one or the other of the two operations separately, this being due to the special nature of the compounds contained therein. For instance heavy hydrocarbons present in these gas mixtures prevent a complete decomposition of the organic sulphur compounds from being obtained by mere catalytical action. On the other hand some particularly resistive sulphur compounds such as thiophen are not converted into hydrogen sulphide by the action of a mixture of chemicals such as mentioned above or by other chemical purification means at the relatively low temperature of about 300° C., at which this operation must be carried through since at higher temperatures the chemicals would bring about an undesirable reduction of part of the carbon oxide to methane.

According to the present process it is possible to quantitatively free from sulphur also gases of the kind here mentioned, including coke oven gas, by operating the first stage at so high a temperature that the more resistive sulphur compounds are converted into other organic or inorganic compounds which can subsequently be extracted in one of the two processes of sulphur fixation. Even at this high temperature the catalysts used in the first stage of the process to decompose the bulk of the organic sulphur compounds, in constrast to the purification mass used in the second stage, do not bring about any undesirable formation of methane.

In order to extract the sulphur in the second stage I have found it particularly advantageous to operate this stage with purification masses which are capable of binding and removing all the sulphur at comparatively low temperatures. I have found that masses containing, besides an iron oxide, also a comparatively large percentage of an alkali carbonate allow extracting also the last traces of sulphur at temperatures ranging between 150 and 300° C. Such purifying masses are disclosed in the copending application for U. S. Letters Patent Serial No. 3094 filed January 23, 1935, by Otto Roelen and Walter Feisst for Process for desulphurizing gases. On the other hand the catalytic decomposition in the first stage always requires operation at a temperature above 300° C.

I am thus also enabled to heat up the gases about to enter the second stage, which have been cooled down before to room temperature in order to allow the hydrogen sulphide to be removed, with the aid of warm heating gases, which have before been used to heat up fresh gases entering the first stage. I am therefore in a position to keep the heat losses, at least in the first stage, low by heat exchange between the entering and the escaping gases of reaction. As pointed out in the foregoing, this is possible without any disadvantage owing to the purification in two stages.

It is also possible to first pass the gas in the second stage in contact with the special purification mass mentioned, consisting for instance of an iron oxide and a large percentage of soda, at a raised temperature and to extract the last traces of sulphur with the aid of spent hydrogenation catalysts, it being even possible to carry this operation through in the hydrogenation apparatus proper. Such a utilization of the hydrogenation catalysts is possible for instance without any disadvantage if they are subsequently regenerated by dissolving them in nitric acid and reprecipitating them, the sulphur being recovered as sulphate in the regeneration liquor.

Alternatively it is also possible to employ in the first stage of the process chemical purification masses, after they have taken up a sufficient percentage of sulphur, as decomposition catalysts at higher temperature.

I may therefore proceed with particular advantage in such manner that a body of purification mass is first used for extracting the last traces of the sulphur still remaining in the gas mixture, whereupon the same body of purification mass is inserted in the corresponding phase of the first stage of the process to be there saturated with sulphur, the temperature being at first held substantially constant for instance at 300° C., whereupon the same body serves as decomposition catalyst in the first stage of the process at a temperature which is preferably raised for instance to 400° C. It could not be foreseen that the same mass would be capable of such double use.

In practising my invention I may for instance proceed as follows:

*Example 1.*—Crude watergas is first freed from all but the last traces of hydrogen sulphide by passing it in contact with about two thirds of the quantity of an iron oxide required for the complete extraction of all the hydrogen sulphide. The partly purified gas is now heated up in a heat exchanger by means of the heat emitted by watergas leaving the catalytic purification apparatus and is thereafter by means of heating gases heated to 400° C. in a separate heater, whereupon it is treated with a decomposition catalyst which may consist for instance of sulphurized iron turnings or steel wool or of a mixture of one part by weight cobalt sulphide and two parts molybdenum oxide, or of nickel metal precipitated on a ceramic carrier. The gas thereafter flows through the heat exchanger and is cooled to room temperature in a cooler, whereupon it is passed in contact with the remaining third of the dry purification mass for the removal of the hydrogen sulphide. The gas is now heated up to 250° C. by the heat of the waste gases from the gas heater and is passed at this temperature across a granulated purification mass being a mixture of two parts of a mass containing iron oxide (Lux mass) and one part soda. The watergas thus treated, while being otherwise unchanged, does not contain any traces of sulphur which might be ascertained by the usual analytical means.

*Example 2.*—A mixture of equal parts watergas and coke oven gas is passed first through moist suspended iron oxide, thereafter through a heat exchanger, through a heater, at 450° C. through a decomposition catalyst consisting of a spent mixture of Lux mass and soda which has absorbed sulphur, again through the heat exchanger, through a cooler, through another body of Lux mass for the removal of hydrogen sulphide, through a gas heater supplied with the waste gases from the first heater, thereafter at 230° C. through another body of Lux mass and soda and finally through a spent hydrogenation catalyst in order to be freed from the .5 gram residual sulphur contained in 100 cubicmetres of the gas.

This treatment leads to a complete desulphuration of the gas. It requires only minimum quantities of fresh chemical purification mass and of heating gas, and the bulk of the sulphur bound to organic radicals is deposited in the dry purification mass in utilizable form. Obviously this mode of proceeding is particularly advantageous.

Various changes may be made in the details disclosed in the foregoing specification without departing from the invention or sacrificing the advantages thereof.

I claim:—

1. The multistage process of removing sulphur in organic combination from a gas mixture containing CO and $H_2$, which comprises the steps of freeing such gas mixture from any substantial amount of hydrogen sulphide, treating the gas mixture, for the decomposition of part of the organic sulphur compounds, with a catalyst possessing about the decomposing efficacy of a sulphurized mixture of iron and soda, this treatment being carried out at a temperature above about 300° C., but lower than that at which, in the presence of the said catalyst, $H_2$ would react materially with the CO present, removing part of the hydrogen sulphide formed in this treatment and passing the partly desulphurized gas mixture at a temperature ranging between about 150° and 300° C. in contact with a mixture of iron oxide and a comparatively large percentage of an alkali metal carbonate.

2. The multistage process of removing sulphur in organic combination from a gas mixture containing CO and $H_2$, which comprises the steps of treating such gas mixture with iron oxide to remove any substantial quantity of hydrogen sulphide present, treating the gas mixture, for the decomposition of part of the organic sulphur compounds, at a temperature ranging between about 300° and 450° C. with the mixture of sulphurized iron oxide and alkali metal carbonate which results in another stage of the process, thereupon treating the gas mixture with iron oxide to remove part of the hydrogen sulphide formed in this treatment and passing the partly desulphurized gas mixture at a temperature ranging between about 150° and 300° C. in contact with a mixture of iron oxide and a comparatively large percentage of an alkali metal carbonate.

3. The process of claim 2 in which the gas mixture is further treated with a spent hydrogenation catalyst.

OTTO ROELEN.